United States Patent [19]
Heller

[11] Patent Number: 5,587,643
[45] Date of Patent: Dec. 24, 1996

[54] ROTARY INDUCTION MACHINE HAVING CONTROL OF SECONDARY WINDING IMPEDANCE

[75] Inventor: Samuel Heller, Westchester County, N.Y.

[73] Assignee: Heller DeJulio Corporation, Danville, Calif.

[21] Appl. No.: 216,090

[22] Filed: Mar. 22, 1994

Related U.S. Application Data

[63] Continuation of Ser. No. 789,993, Nov. 12, 1991, abandoned, which is a continuation of Ser. No. 489,894, Mar. 6, 1990, abandoned, which is a continuation-in-part of Ser. No. 218,575, Jul. 12, 1988, abandoned.

[51] Int. Cl.$^6$ ................................................. H02P 13/00
[52] U.S. Cl. ................................................. 318/821
[58] Field of Search .............................. 312/254, 439,
312/138, 799–817, 729, 438, 827; 388/808,
807, 813, 824, 822, 823; 363/37, 56; 318/821

[56] References Cited

U.S. PATENT DOCUMENTS

| | | | |
|---|---|---|---|
| 455,067 | 6/1891 | Tesla | 318/821 |
| 610,025 | 5/1898 | Bradley | 318/729 |
| 853,465 | 5/1907 | Mershon | 318/729 |
| 1,837,563 | 12/1931 | Mayer | 318/729 |
| 1,854,447 | 4/1932 | Chromy | 318/729 |
| 2,160,594 | 5/1939 | Krebs | 388/805 |
| 2,642,808 | 8/1953 | Tiede | 318/800 |
| 2,881,376 | 4/1959 | Shaw | 318/729 |
| 3,774,883 | 11/1973 | Ostrom | 318/6 X |
| 3,969,659 | 7/1976 | Thode | 318/823 |
| 4,206,345 | 6/1980 | Okuyama et al. | 318/822 X |
| 4,206,395 | 6/1980 | Okuyama et al. | 318/822 X |
| 4,642,545 | 2/1987 | Lewus | 318/729 |
| 4,833,584 | 5/1989 | Divan | 363/37 |
| 4,959,573 | 9/1990 | Roberts | 318/817 X |

*Primary Examiner*—Anthony Wysocki
*Attorney, Agent, or Firm*—Flehr, Hohbach, Test, Albritton & Herbert

[57] ABSTRACT

A rotary induction machine having wound primary and secondary windings with capacitive means connected directly across said secondary windings and resistive means connected in series with said secondary windings.

2 Claims, 5 Drawing Sheets

ROTARY INDUCTION MACHINE HAVING CONTROL OF SECONDARY WINDING IMPEDANCE

This is a continuation of application Ser. No. 07/789,993 filed Nov. 12, 1991, which is a continuation of prior application Ser. No. 07/489,894 filed Mar. 6, 1990, which is a continuation-in-part of prior application Ser. No. 07/218,575 filed Jul. 12, 1988 all abandoned.

FIELD OF THE INVENTION

This invention relates generally to rotary induction machines of the type having a wound rotor and more particularly to wound rotor induction motors and generators in which the impedance of the secondary is controlled by connecting capacitors directly across the secondary windings.

BACKGROUND OF THE INVENTION

In induction machines the current in the secondary winding (usually the rotor) are created solely by induction. These currents result from voltages induced in the secondary windings by rotating magnetic fields in the primary winding which arise from the application of line voltages thereto.

When the machines are operated as a motor, the rotor rotates at speeds below the synchronous speed. The difference in speed is referred to as the slip speed, usually expressed as a decimal of the synchronous speed.

The rotor windings are generally connected to slip rings and adjustable resistances are connected in series with the windings. The resistances limit the secondary currents during "start." As the motor picks up speed the secondary resistance is gradually reduced whereby the efficiency increases. The resistance can also be used to control the speed; however, this method of speed control is very inefficient.

When the rotor is driven at above the synchronous speed, the machine acts as a generator. With resistance in the secondary windings, the output power can be maintained somewhat constant over a narrow range of rotor speeds.

For the past thirty years or more when driving a generator with various types of prime movers, the speed of the electrical generator was kept nearly constant. Various mechanical methods for controlling speed have been used depending on the prime mover. When using an alternator with DC excited fields, the rpm must be kept constant to a very close tolerance; less than one revolution of 1800 or 3600 revolutions per minute. When using a squirrel-cage induction generator, the most common cogeneration generator, a few percent above base rpm is necessary. If inadvertently, a higher speed is supplied by the prime mover, the generator completely releases its load and a "runaway condition" exists. Under such circumstances, the prime mover, a wind or steam turbine, or a diesel, may race to destruction in a very few minutes or seconds.

In equipment for wind, water, wave power, thermal, etc., mechanical means are used to maintain constant speed. Spoilers, blade pitch control and mechanical brakes are used to limit the speed. All these methods have a very short life and are costly to maintain.

In U.S. Pat. No. 2,648,808 there is described a motor having a wound primary winding (stator) in which the effective impedance of the primary windings is varied to improve the torque-speed characteristics of the motor. More particularly, the power factor of the motor is improved by controlling the impedance of the primary windings by adding thereto external series impedances.

OBJECTS AND SUMMARY OF THE INVENTION

It is a general object of this invention to provide an improved rotary induction machine.

It is a further object of this invention to provide a wound rotor induction machine in which capacitors are connected directly across the secondary winding to improve the efficiency.

It is a further object of this invention to provide a wound rotor induction generator in which capacitors are added in parallel with the secondary winding to control the current flowing therethrough to increase the power output and efficiency.

It is another object of this invention to provide an efficient variable speed motor.

It is a further object of this invention to provide an induction generator which can be operated efficiently over a wide range of rotor speeds.

An objective for power generation is to get maximum power output. The generator of the present invention can deliver power over a much wider range and a larger capacity than known generators. The generator maintains its frequency over a variable speed range. The generator is ideally suited for "peaking" requirements with diesel, steam or gasoline type prime movers.

In many areas, the induction type squirrel-cage generator is tied to a grid of a very limited capacity. When starting the generator, it is desirable to reach near base speed as soon as possible before applying the prime mover. Unfortunately, the squirrel-cage induction generator takes from six to ten times rated amperes at starting. On a limited capacity grid, this voltage dip will lower the voltage noticeably and may even cause contactors and relays to drop out. The power lost with each start may be more annoying than the results.

The wound-rotor type generator, when used as a motor, has the highest torque-per-ampere of any AC motor type. The inrush amperes can be easily cut to half or less of the squirrel-cage type. This effect not only increases the KW output but prevents the voltage dip problem almost completely.

The frequency in the secondary of the generator is in direct proportion to the rpm above the base speed. Thus, in a 900 rpm, 8 pole, 60 Hz machine, the frequency in the secondary at 900 rpm is zero. The rise in frequency is 60 Hz for each 900 rpm above base speed. So it is 60 Hz at 1800 rpm in the secondary of this machine.

This is important. It means the generator is being driven in the same direction that it would run as a motor. Thus, there is no need to reverse any connections to use the generator as a motor for assisting the generator to reach base speed.

These and other objects of this invention are accomplished by inserting across the secondary windings a capacitance which modifies the impedance of the secondary windings to control the current flowing therethrough.

DESCRIPTION OF THE PREFERRED EMBODIMENT

Figure 1:
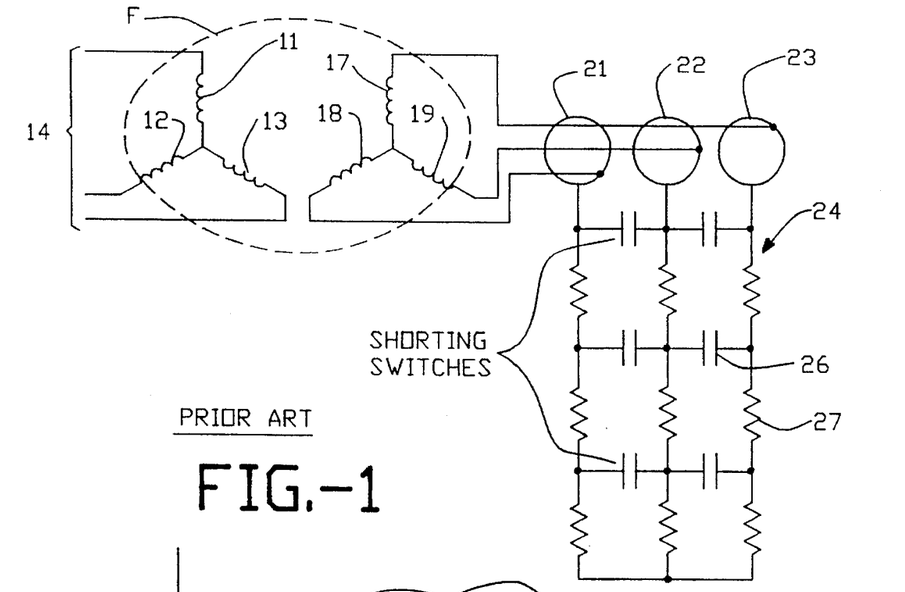
FIG. 1 is a schematic diagram of an induction motor in accordance with the prior art.

The prior art induction machine shown in FIG. 1 includes primary windings 11, 12, 13 shown connected in a "Y" configuration to the voltage supply 14. The windings are wound in the stator of the machine in accordance with well known winding practices. The voltage applied generates currents in the windings which generate a primary field "F" which is coupled to the wound rotor including windings 17, 18, 19. The rotor is connected to a shaft, not shown. Each of the secondary windings is connected to a slip ring 21, 22, 23 respectively and in turn to a resistive network 24 which includes shorting switches 26 and resistors 27.

As described above, all switches are open as voltage is first applied to start the machine. The resistance in series with the rotor windings is maximum, thereby limiting the starting current. As the rotor speed increases the switches are sequentially closed to thereby remove more and more resistance, thereby allowing the speed to increase and provide maximum torque at higher speeds. The current reduces because the relative speed between the primary magnetic fields and the rotor windings is reduced, thereby reducing the induced current.

Figures 2, 3:
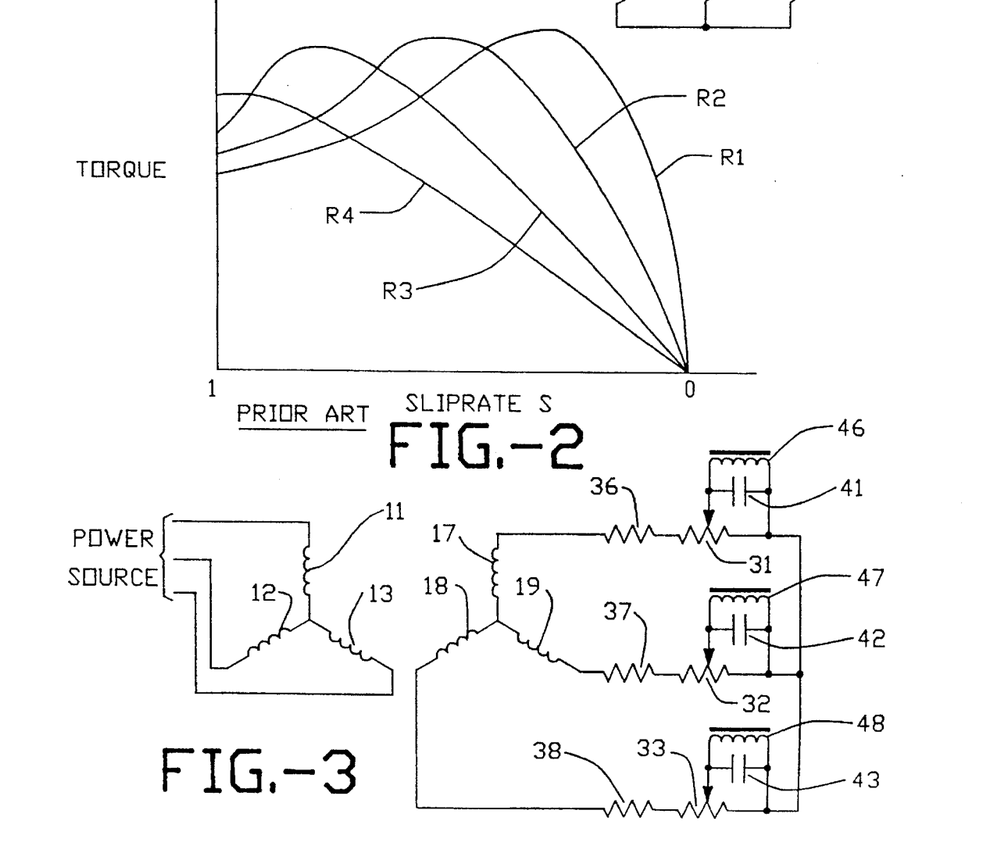
FIG. 2 is a graph showing power output as a function of slip for the prior art device shown in FIG. 1.
FIG. 3 is a schematic diagram of a wound rotor induction machine in accordance with the prior art.

Referring particularly to FIG. 2, the curves show the torque as a function of slip rate. It is seen that with the resistance R1, the maximum power is achieved at the slip rate or rotor speed and that as the resistance is decreased, higher torque is achieved at lower slip rates. The efficiency is substantially higher when the resistance is low because the resistive losses in the rotor secondary circuit are minimized.

The prior art teaches that the operating characteristics of an induction motor or generator are substantially improved by adding in the secondary windings a reactive impedance. A prior art machine is shown in FIG. 3. Potentiometers 31, 32 and 33 are connected in series, one with each winding to provide adjustable resistance. The winding resistance is shown at 36, 37 and 38. The potentiometer wiper is connected to a parallel combination of a bridging capacitor 41, 42 and 43 and an inductor 46, 47 and 48.

Figure 4:
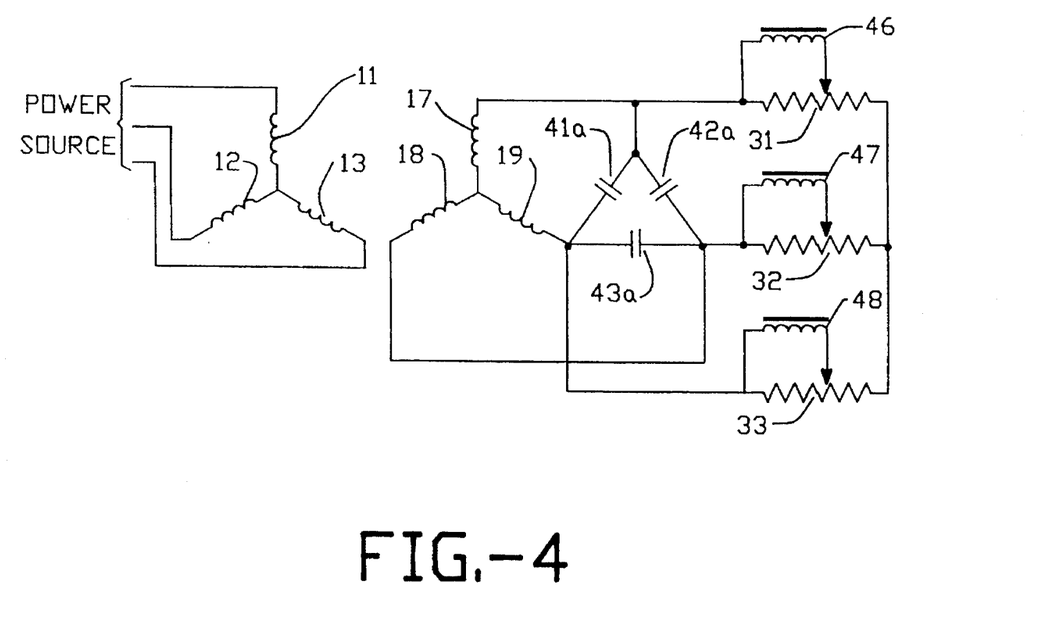
FIG. 4 is a schematic diagram of a wound rotor induction machine in accordance with the present invention.
Figure 5:
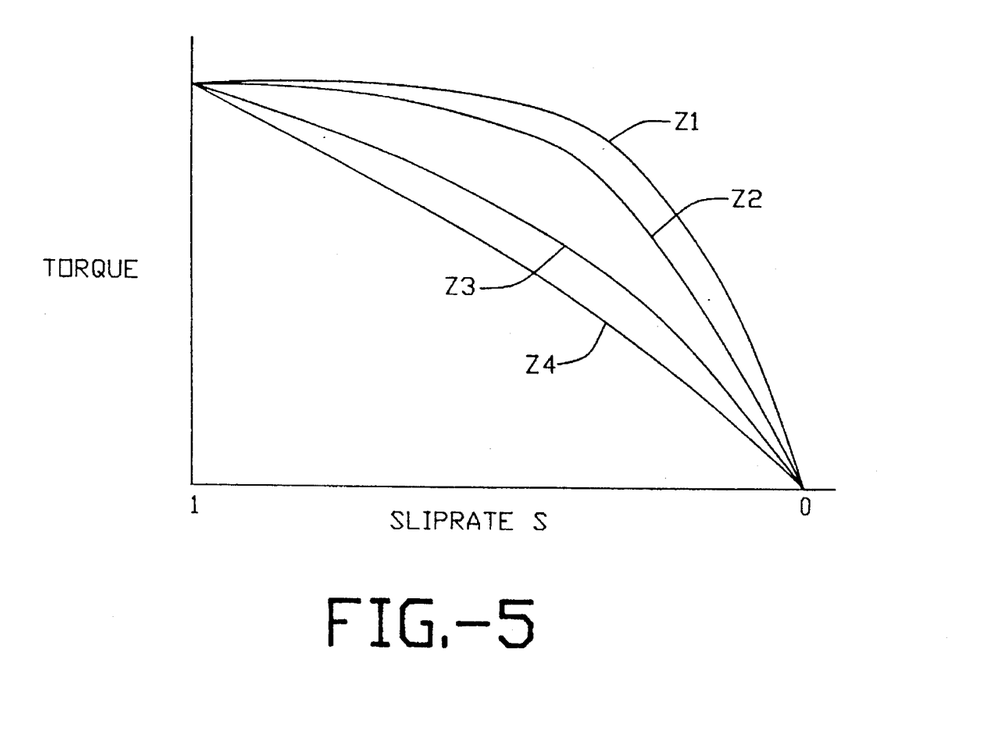
FIG. 5 shows slip rate as a function of torque for the embodiment of FIG. 4.

I have discovered that by connecting the capacitors directly across the windings the efficiency of the machine is substantially improved. In FIG. 4 the capacitors 41a, 42a and 43a, which may be variable capacitors, are connected in parallel to the secondary windings with the inductors and resistors in series. As a result, the reactive impedance of each winding is increased. The phase lag of the secondary current with respect to the secondary voltage is decreased, thereby increasing the power output torque for the lower slip rates. This is shown in the family of curves of FIG. 5 which are shown for various impedance values $Z_1$, $Z_2$, $Z_3$ and $Z_4$. It is noted that for the lowest impedance values $Z_1$, the maximum power is delivered over a broad range of slip rates, thereby improving the speed torque characteristics of the motor.

In one example, a 3 kilowatt, 900 rpm, 60 Hz machine was operated as a generator with resistors only in the secondary in accordance with the prior art, and also in accordance with this invention, with impedance in the secondary. The output power was compared for identical speeds. The values of capacitors 41a, 41b and 41c and resistors 31, 32 and 33 were as follows at each speed. No external inductance was added.

| Speed (RPM) | Resistance (Ohms) | Capacitance (Mf) |
| --- | --- | --- |
| 990 | 1.5 | 0 |
|  | 1.5 | 200 |
| 125 | 4.7 | 0 |
|  | 5.8 | 200 |
| 350 | 11.6 | 0 |
|  | 37.5 | 100 |
| 575 | 15.75 | 0 |
|  | 37.5 | 25 |
| 1800 | 20.0 | 0 |
|  | 49.5 | 25 |

Figure 6:
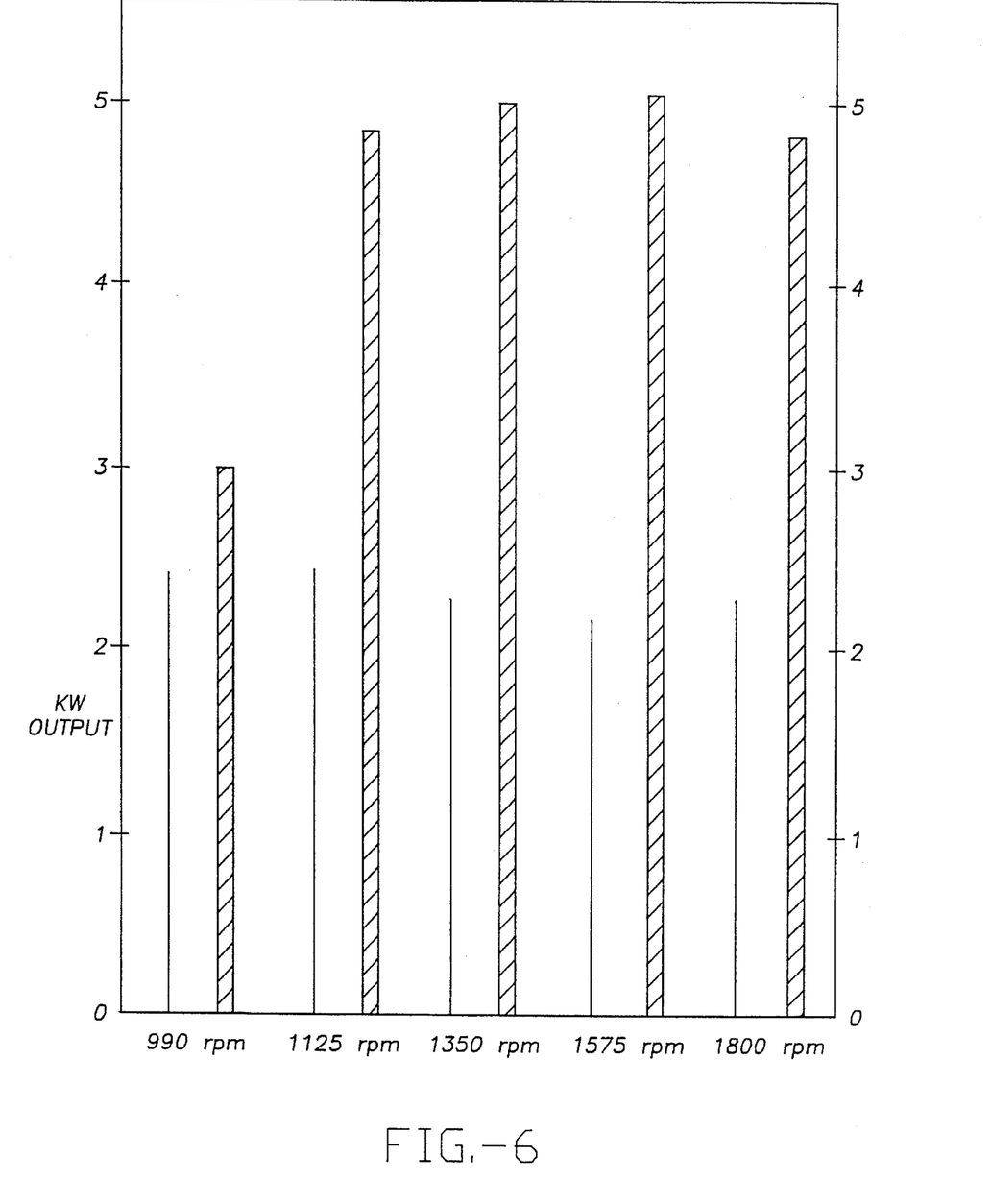
FIG. 6 is a graph showing the operating characteristics of an induction device in accordance with the embodiment of FIG. 4.

The results are shown in the bar chart of FIG. 6. In each case, the resistance in each phase of the secondary of the ordinary generator was changed. The results were noted when the full rated current was reached in the machine for various speeds. Then a capacitor was connected across the secondary and the same current maintained. The results for various impedances and speeds were recorded. The bar chart shows the results for the speeds indicated. The top of each bar graph shows the output of the generator at various speeds. The power output for the normal generator with R only is shown in solid line and for a generator in accordance with this invention with capacitors connected across the windings as hatched.

When operated in accordance with the prior art, the generator did not obtain three kilowatt output. As seen by the other bars in all instances, the generator maintained 100% or more of rated load over the wide range of speeds shown. In two instances it achieved 5 kilowatt output.

Figure 7:
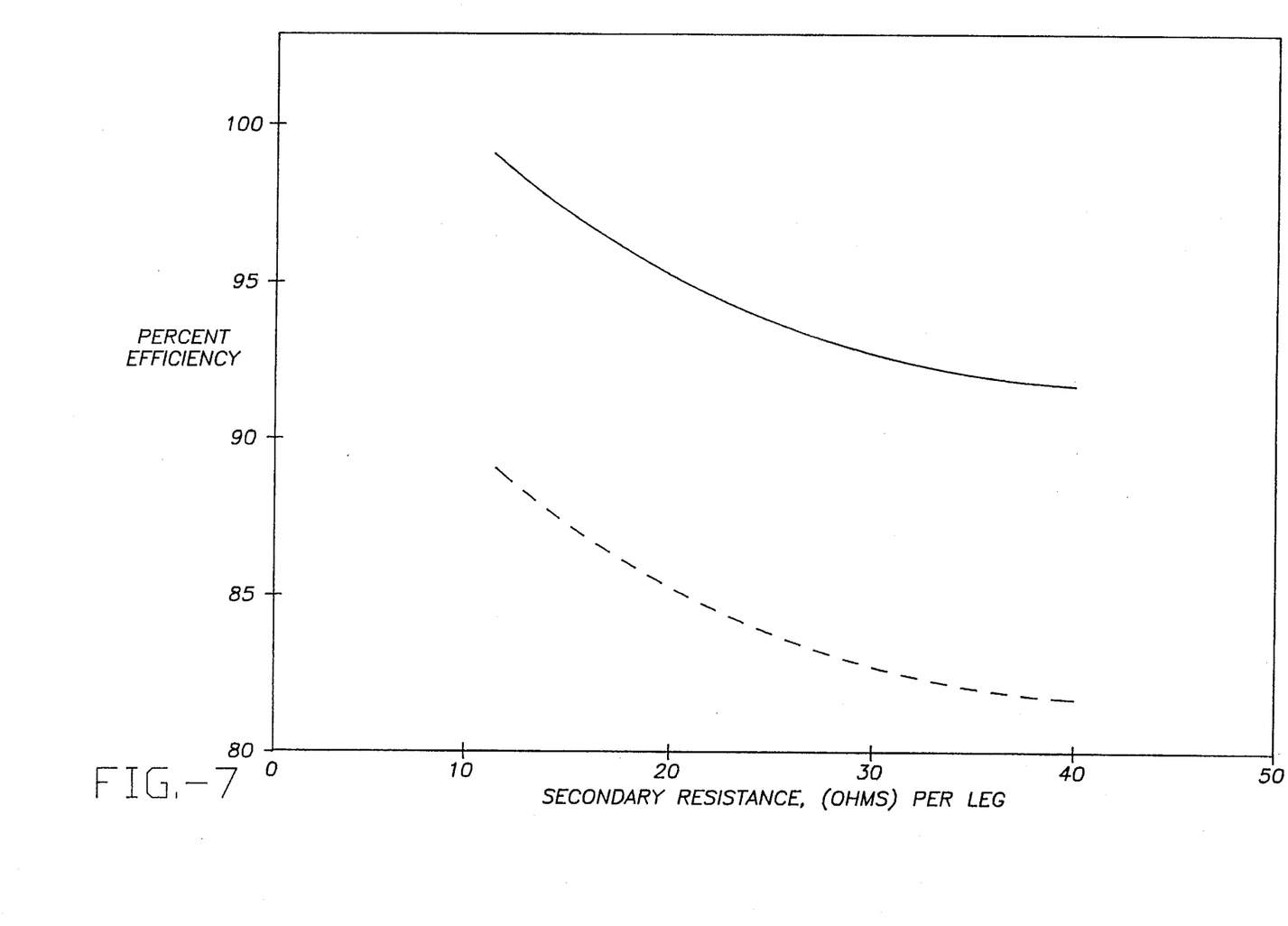
FIG. 7 shows the efficiency as a function of resistance per leg for the generators of FIGS. 3 and 4 with capacitors of substantially equal value connected as shown and no inductance.
Figure 8:
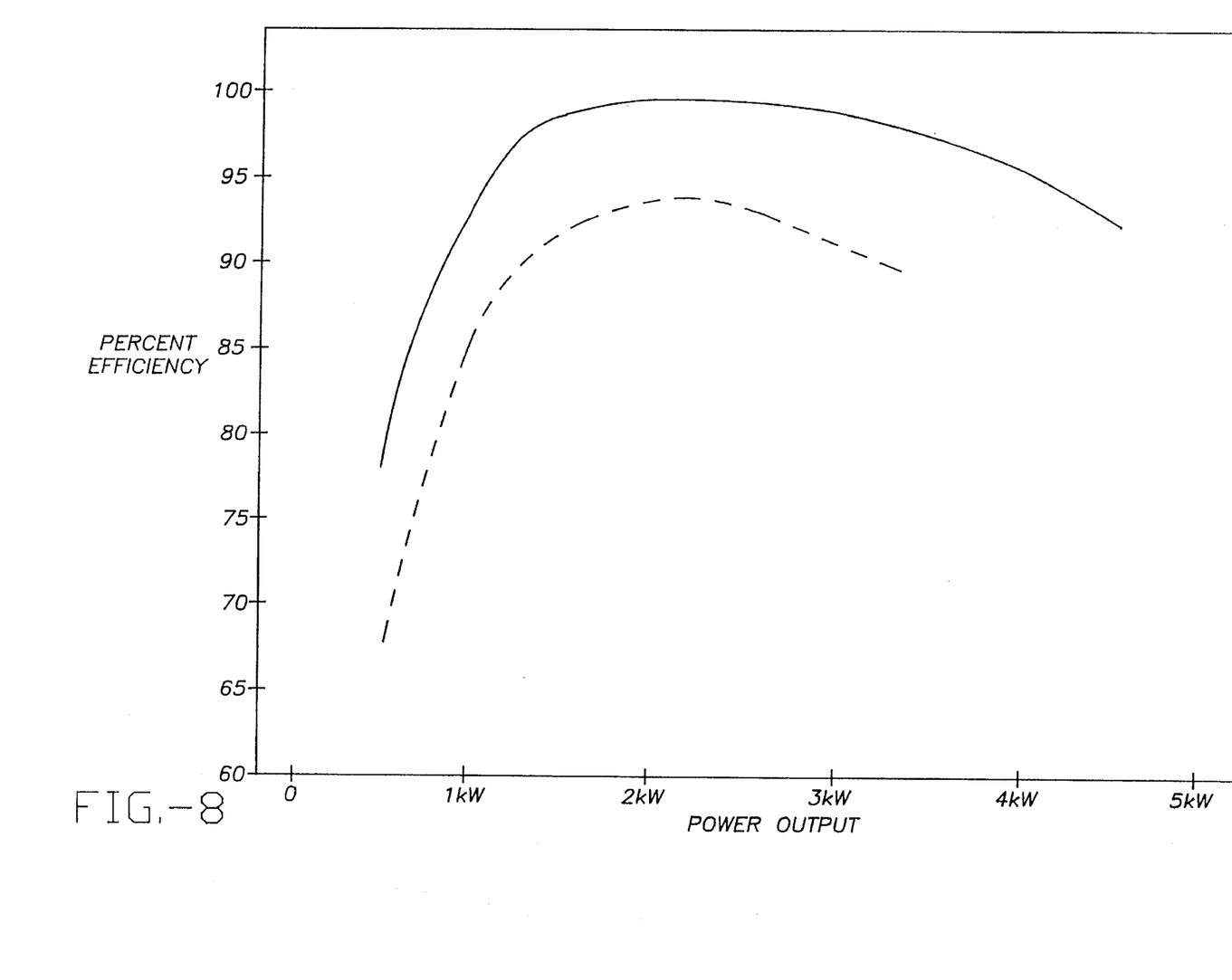
FIG. 8 shows the efficiency as a function of output for various outputs for the generators of FIGS. 3 and 4 with capacitors of substantially equal value connected as shown and no inductance.

In another example a three kilowatt wound rotor slip ring generator having base speed of 900 rpm of 60 Hz with a full load current rating of 11.4 amperes was connected as shown in FIGS. 3 and 4 without any inductance. The generator was driven by a calibrated D.C. motor fed by a Ward Leonard drive. The efficiency of the generator with both connections is shown in FIGS. 7 and 8 where efficiency is given as a percent of rated full load efficiency. The capacitance added in the prior art generator was 366 microfarads and in the present invention 350 microfarads, substantially identical. FIG. 7 shows the efficiency as a function of resistance per leg for a generator in accordance with the invention in solid line and in the prior art in dotted line. The present invention provides the highest efficiency for a variable speed AC motor or generator.

FIG. 8 compares the efficiency and kilowatt output with the same resistance (11.6 ohms) in the secondary legs. With the prior art circuit, dotted line, full load amperes were reached at 3.35 kilowatt output whereas in the present invention, solid line, full load amperes were reached at 4.5 kilowatt output. The efficiency is clearly higher at all outputs.

Table I details specific values of resistance, capacitance, amperage, speed and efficiency for given outputs with substantially identical values of amperes for the machine described above. The table includes three examples: prior art with resistors only (FIG. 1), prior art with resistance and capacitance in parallel in series with the windings (FIG. 3) and the present invention with resistance in series with the windings and capacitance in parallel with the windings (FIG. 4). The present invention is more efficient in each example.

In the tint, top set, (11.6 ohms per leg), note that the parallel resistor capacitor prior art cannot go much above 3500 watts output, whereas the present invention at 4500 watts is slightly overloaded. At 3500 watts, the efficiency of the present invention is about 9% higher.

In the second set using 25 ohms in the secondary leg, the prior art can go to about 4500 watts, with again about 9% difference in efficiency and about 200 rpm higher for the prior art system.

In the third set at 40 ohms per leg in the secondary, the prior art is still about 200 rpm higher (more wear and tear on equipment) but the efficiency is now about 14% better for the system of the present invention.

Thus by varying the resistors and/or capacitor values, the system of the present invention results in more efficient operation. The system can be changed for any maximum speed by changing the value of the external capacitors and resistors. The speed changes are of particular advantage for wind turbines, wave machines, etc.

TABLE I

GENERATOR TESTS - SAMPLE RESULT

| Type and Connection | Load Details and Results | | | Load Details and Results | | | Load Details and Results | | | Load Details and Results | | | Resistance and Capac. | |
|---|---|---|---|---|---|---|---|---|---|---|---|---|---|---|
| Prior Art Resistors Only, in Secondary FIG. 1 | 2000 Watts RPM / 1792 | Line Amps / 11.7 | Eff. / 51.63 | X | | | X | | | X | | | Ohms R / 11.6 | mF / 0 |
| Prior Art Capacitors in Parallel W/Resistors FIG. 3 | 3000 Watts RPM / 1219 | Line Amps / 10.3 | Eff. / 89.1 | 3500 Watts RPM / 1252 | Line Amp. / 11.2 Nearly Full Load | Eff. / 88.2 | X | | | X | | | Ohms R / 11.6 | mF in / 366 |
| Present Invention FIG. 4 | 3000 Watts RPM / 1139 | Line Amps / 8.8 | Eff. / 99.09 | 3500 Watts RPM / 1158 | Line Amps / 9.6 | Eff. / 97.15 | 4000 Watts RPM / 1178 | Line Amps / 10.8 | Eff. / 95.23 | 4500 Watts RPM / 1195 | Line Amps / 11.9 Slight Overload | Eff. / 92.28 | Ohms R / 11.6 | mF Cap. / 350 |
| Prior Art Resistors Only, in Secondary FIG. 1 | 2000 Watts RPM / 1507 | Line Amps / 11.1 Nearly Full Load | Eff. / 72.83 | X | | | X | | | X | | | Ohms R / 25 | mF Cap. / 0 |
| Prior Art Capacitors in Parallel W/Resistors FIG. 3 | 3000 Watts RPM / 1317 | Line Amps / 7.7 | Eff. / 88.32 | 3500 Watts RPM / 1353 | Line Amps / 8.7 | Eff. / 82.56 | 4000 Watts RPM / 1382 | Line Amps / 9.6 | Eff. / 67.91 | 4450 Watts RPM / 1406 | Line Amps / 10.5 | Eff. / 81.93 | Ohms R / 25 | mF Cap. / 366 |
| Present Invention FIG. 4 | 3000 Watts RPM / 1182 | Line Amps / 7.2 | Eff. / 93.71 | 3500 Watts RPM / 1202 | Line Amps / 8.3 | Eff. / 93.70 | 4000 Watts RPM / 1216 | Line Amps / 9.2 | Eff. / 94.55 | 4500 Watts RPM / 1232 | Line Amps / 10.6 | Eff. / 90.34 | Ohms R / 25 | mF Cap. / 350 |
| Prior Art Resistors Only, in Secondary FIG. 1 | 1500 Watts RPM / 1570 | Line Amps / 9.2 | Eff. / 63.60 | X | | | X | | | X | | | Ohms R / 40 | mF Cap. / 0 |
| Prior Art Capacitors in Parallel W/Resistors FIG. 3 | 3000 Watts RPM / 1372 | Line Amps / 6.6 | Eff. / 84.63 | 3500 Watts RPM / 1408 | Line Amps / 8.1 | Eff. / 78.97 | 4000 Watts RPM / 1441 | Line Amps / 9.3 | Eff. / 77.17 | 4500 Watts RPM / 1465 | Line Amps / 10.6 | Eff. / 74.28 | Ohms R / 40 | mF Cap. / 366 |
| Present Invention FIG. 4 | 3000 Watts RPM / 1201 | Line Amps / 6.9 | Eff. / 92.59 | 3500 Watts RPM / 1216 | Line Amps / 8.1 | Eff. / 91.81 | 4000 Watts RPM / 1238 | Line Amps / 9.3 | Eff. / 95.47 | 4500 Watts RPM / 1249 | Line Amps / 10.6 | Eff. / 88.55 | Ohms R / 40 | mF Cap. / 350 |

I claim:

1. A rotary induction generator comprising a stator having wound thereon stator windings defining a three-phase stator;

a rotor mounted for rotation in said stator and having wound thereon three rotor winding defining a three-phase rotor;

said three-phase stator windings adapted to be connected to a source of electrical power and serving as primary windings whereby the applied power causes current to flow in said three-phase windings and provide a rotating magnetic field;

said other three-phase windings serving as a secondary winding coupled to said magnetic field whereby currents are induced in said secondary windings which in turn induce power in said primary windings in response to rotation of the rotor;

capacitive means connected directly across each of said secondary windings having a value sufficient to increase the efficiency of said machine; and resistive means connected in series with said secondary windings to control the power output for different rotor speeds.

2. A rotary induction generator having polyphase, primary and secondary windings including a resistor connected in series with each secondary winding to control the power output for different rotary speeds, and a capacitor connected between each pair of the polyphase secondary winding terminals to increase the power output and the efficiency of the machine.

* * * * *

UNITED STATES PATENT AND TRADEMARK OFFICE
CERTIFICATE OF CORRECTION

PATENT NO. : 5,587,643

DATED : December 24, 1996

INVENTOR(S) : HELLER

It is certified that error appears in the above-indentified patent and that said Letters Patent is hereby corrected as shown below:

At column 4, line 22, delete "125" and insert therefor --1125--.

At column 4, line 24, delete "350" and insert therefor --1350--.

At column 4, line 26, delete "575" and insert therefor --1575--.

At column 5, line 57, delete "tint" and insert therefor --first--.

At column 6, line 60, Claim 1, delete "winding" and insert therefor --windings--.

Signed and Sealed this

Twenty-third Day of December, 1997

Attest:

BRUCE LEHMAN

*Attesting Officer*  *Commissioner of Patents and Trademarks*